United States Patent [19]

Inoue et al.

[11] Patent Number: 5,254,621
[45] Date of Patent: Oct. 19, 1993

[54] AIR BAG COATING COMPOSITION AND AIR BAG

[75] Inventors: Yoshio Inoue; Kazuma Momii, both of Annaka, Japan

[73] Assignee: Shin-Etsu Chemical Co., Ltd., Tokyo, Japan

[21] Appl. No.: 955,383

[22] Filed: Oct. 1, 1992

[30] Foreign Application Priority Data

Oct. 1, 1991 [JP] Japan .................. 3-280635

[51] Int. Cl.$^5$ .......................... C08J 5/02; C08L 83/06
[52] U.S. Cl. .................... 524/837; 280/728; 428/12; 428/35.5; 428/290
[58] Field of Search .......... 524/837; 280/728; 428/12, 35.5, 290

[56] References Cited

U.S. PATENT DOCUMENTS

| | | | |
|---|---|---|---|
| 3,705,645 | 12/1972 | Konen | 428/520 |
| 3,817,894 | 6/1974 | Butler et al. | |
| 4,496,687 | 1/1985 | Okada et al. | 524/837 |

FOREIGN PATENT DOCUMENTS

| | | |
|---|---|---|
| 0131870 | 1/1985 | European Pat. Off. |
| 0186839 | 7/1986 | European Pat. Off. |
| 43-18800 | 8/1968 | Japan |
| 54-131661 | 12/1979 | Japan |
| 56-16553 | 2/1981 | Japan |

OTHER PUBLICATIONS

WPIL, File Supplier, Derwent Pub. Ltd., AN=-91-364514 & JP-A-3 243 442 Oct. 30, 1991 (Toray Ind. Inc.).

WPIL, File Supplier, Derwent Pub. Ltd., AN=-90-372957 & JP-A-@ 270 654 Nov. 11, 1990 (Takita KK).

Primary Examiner—Melvyn I. Marquis
Assistant Examiner—D. Aylward
Attorney, Agent, or Firm—Millen, White, Zelano & Branigan

[57] ABSTRACT

An air bag coating composition is provided in the form of an aqueous silicone emulsion composition comprising (A) an aqueous emulsion of a hydroxyl-containing organopolysiloxane, (B) a reaction product of an amino functional silane or a hydrolyzate thereof with an acid anhydride, an epoxy-functional silane or a hydrolyzate thereof, or an organosilane having an isocyanate radical and a hydrolyzable radical in a molecule or a hydrolyzate thereof, (C) colloidal silica, and (D) a curing catalyst. The composition is applied and cured to an air bag base fabric to form a tack-free, crack resistant coating thereon.

15 Claims, No Drawings

AIR BAG COATING COMPOSITION AND AIR BAG

FIELD OF THE INVENTION

This invention relates to an air bag coating composition and more particularly, to a coating composition suitable for forming coatings on plain weave fabrics of polyimide and polyester fibers for air bags. It also relates to an air bag having a coating of the composition cured to base fabric.

BACKGROUND OF THE INVENTION

The mainstream air bags were those bags made of nylon fabric coated with chloroprene rubber. As a substitute for the chloroprene rubber, air bags coated with silicone were recently developed for the purposes of improving heat resistance, weather resistance and flame retardance.

Air bag coating compositions based on chloroprene or silicone are generally prepared by adding curing agents, flame retardants, adhesion aids, reinforcements and the like to chloroprene rubber or silicone rubber, followed by diluting with organic solvents. The compositions are then applied to base fabrics of nylon or the like.

The air bag is of the design that it is normally folded to small dimensions, but instantaneously inflated when explosive gas is injected. On inflation, the coating applied to the air bag fabric is also instantaneously stretched following the air bag fabric. Thus the coating itself should be mechanically strong. Therefore, the currently available chloroprene and silicone air bag coating compositions both use base polymers of a relatively high molecular weight so that cured coatings thereof may have strength and elongation. The air bag coating compositions using high molecular weight base polymers, however, are quite difficult to apply to a coating thickness of 40 to 100 $\mu$m normally required for air bags using knife coaters, offset roll coaters, gravure coaters or the like. The air bag coating compositions using high polymers must be diluted with organic solvents to a sufficient viscosity to allow easy coating.

However, the use of organic solvents has serious problems that they have the risk of ignition by static electricity especially in the working environment and that they are harmful to the operator by way of inhalation or skin contact. In addition, evaporated solvents impose the problems that their recovery is very expensive and if not recovered, they cause air pollution. For these reasons, coating compositions free of organic solvents are now desired in all industrial fields.

Among means for changing the air bag coating composition to a solventless system, the simplest way is to reduce the viscosity of the base polymer to a sufficient level to allow for coating by means of a knife coater or the like. However, a base polymer having a lower degree of polymerization is somewhat low in mechanical strength so that cracks can form on the coating surface upon air bag inflation and hot explosive gas can bleed out therethrough. If the viscosity is reduced too low, the composition will strike through a base fabric or plain weave fabric of nylon fibers, resulting in a less smooth surface. If the composition on the rear surface is cured as struck-through and then wound up, the coated fabric gives rise to blocking. Additionally, the struck-through composition will adhere to rolls of the coating machine, adversely affecting operating efficiency and outer appearance.

It was thus proposed to use aqueous silicone emulsion compositions which cure into silicone elastomers as the solventless air bag coating composition. Prior art aqueous silicone emulsion compositions did not firmly bond to air bag base fabrics or plain weave fabrics of polyimide or polyester fibers.

Japanese Patent Application Kokai (JP-A) No. 16553/1981 discloses a silicone emulsion composition comprising an anionically stabilized hydroxylated diorganopolysiloxane, colloidal silica, and an organic tin compound or organic amine compound at pH 9 to 11.5. Undesirably, this composition is limited in many aspects upon application because of its poor bond to certain base fabrics and strong alkalinity.

A variety of proposals were made in order to improve the adhesion of compositions of this type. For example, JP-A 131661/1979 discloses an organopolysiloxane latex composition obtained by emulsion polymerizing a cyclic organosiloxane and a functional group-containing organotrialkoxysilane (e.g., aminoalkyltrialkoxysilane) in the presence of a sulfonic acid or quaternary ammonium salt surfactant. USP No. 3,817,894 discloses a silicone latex composition comprising a siloxane block copolymer including dimethylsiloxane and monophenylsiloxane units, water, a cationic surfactant, a nonionic surfactant, a filler and an amino-functional alkoxysilane. These compositions, however, are less stable due to the presence of cationic surfactants.

In general, silicone latexes are often prepared using anionic emulsifiers rather than cationic emulsifiers from the standpoint of stability of silicone latexes (see Japanese Patent Publication No. 18800/1968, for example). These systems have the serious drawback that if silicone latexes stabilized with anionic emulsifiers are combined with amino-functional silanes or partial hydrolyzates thereof for improving adhesion, then substantial thickening (viscosity increase) or gelation (formation of insoluble matter and precipitates) occurs.

SUMMARY OF THE INVENTION

Therefore, an object of the present invention is to provide an air bag coating composition which is free of an organic solvent, applicable to plain weave air bag fabrics without strike-through, easy and safe to work with, and which cures to coatings having excellent rubbery properties, good adhesion to air bag fabrics, and a tack-free surface. Another object of the invention is to provide an air bag having a cured coating of the coating composition formed thereon.

We have found that when an aqueous silicone emulsion composition comprising an aqueous silicone emulsion in which an organo-polysiloxane having at least two hydroxyl radicals attached to silicon atoms in a molecule is emulsified in water, colloidal silica, and a curing catalyst is blended with a reaction product of an amino-functional silane or a hydrolyzate thereof with an acid anhydride, an epoxy-functional silane or a hydrolyzate thereof, or an organosilane having an isocyanate radical and a hydrolyzable radical in a molecule or a hydrolyzate thereof, or a mixture thereof, there is obtained a composition which is applicable to plain weave air bag fabrics of polyamide, polyester or the like without strike-through and firmly bondable to the fabrics. The composition cures to coatings having a tack-free surface, excellent rubbery properties, and high mechanical strength to prevent cracking upon inflation of the air bag. Additionally, the composition is safe due to the absence of an organic solvent, curable at room temperature simply by removing water, and easy to work with.

Accordingly, the present invention provides an aqueous silicone emulsion composition for forming a coating on an air bag, comprising (A) an aqueous silicone emulsion in which an organopolysiloxane having at least two hydroxyl radicals attached to silicon atoms in a molecule is emulsified in water, (B) at least one member selected from the group consisting of (b-1) a reaction product of an amino-functional silane or a hydrolyzate thereof with an acid anhydride, (B-2) an epoxy-functional silane or a hydrolyzate thereof, and (B-3) an organosilane having an isocyanate radical and a hydrolyzable radical in a molecule or a hydrolyzate thereof, (C) colloidal silica, and (D) a curing catalyst.

DETAILED DESCRIPTION OF THE INVENTION

Component (A) of the air bag coating composition of the invention is an aqueous silicone emulsion in which an organopolysiloxane is emulsified in water. The organopolysiloxane should have at least two hydroxyl radicals attached to silicon atoms in a molecule. Prior art well-known ones may be used since latitude is given as to the attachment site of hydroxyl radicals, the type of an organic radical attached to a silicon atom other than the hydroxyl radicals, molecular structure, degree of polymerization, and the like. The organopolysiloxane of the following average compositional formula is preferably uses:

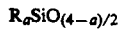

wherein R is a substituted or unsubstituted monovalent hydrocarbon group having 1 to 10 carbon atoms, more preferably 1 to 8 carbon atoms and letter a is a positive number of 1.70 to 2.05. R groups may be identical or different and selected from substituted or unsubstituted monovalent hydrocarbon groups, for example, alkyl groups such as methyl, ethyl, propyl, butyl and hexyl group; cycloalkyl groups such as cyclohexyl, alkenyl groups such as vinyl and allyl groups; aryl groups such as phenyl and tolyl groups; and substituted ones of these groups in which one or more of the hydrogen atoms attached to carbon atoms are replaced by halogen atoms, cyano groups or the like, such as chloromethyl, trifluoropropyl and cyanoethyl groups. Letter a is a positive number of 1.98 to 2.01. The preferred R groups are methyl, ethyl, phenyl, trifluoropropyl, cyanoethyl, vinyl and allyl groups. More preferably methyl groups are present in an amount of at least 50 mol %, especially at least 80 mol %. The terminal groups of the organopolysiloxane should preferably be hydroxyl radicals. Desirably, the organopolysiloxane has a molecular weight of at least 10,000, preferably 10,000 to 500,000, more preferably 200,000 to 500,000 because coatings of lower molecular weight siloxanes become short of strength and elongation so that the coatings might crack upon inflation of the air bag. The polymerization degree may preferably be in the range of 3000 to 7000.

The organopolysiloxane may be prepared, for example, through ring-opening reaction of a cyclic siloxane such as an octaorganocyclo-tetrasiloxane, hydrolysis of a linear or branched organopolysiloxane having a hydrolyzable radical such as alkoxy and acyloxy radicals, and hydrolysis of one or more organo-halogenosilanes.

In preparing component (A), there may be used an anionic emulsifier which may be selected from conventional well-known ones. Preferred anionic emulsifiers are those which can be emulsion polymerization catalysts and exhibit surface activity, for example, sulfonic acids, sulfuric acids, phosphoric acids and salts thereof. Illustrative examples include aliphatic sulfates such as sodium lauryl sulfate, aliphatic hydrocarbon radical-substituted benzenesulfonates such as dodecylbenzenesulfonates, aliphatic hydrocarbon radical-substituted naphthalenesulfonates, polyethylene glycol sulfate salts, and lauryl phosphate salts.

Component (A) or aqueous silicone emulsion may be prepared by any of prior art well-known methods, for example, by emulsifying an organopolysiloxane having at least two ≡Si—OH bonds in a molecule in water in the presence of an anionic emulsifier. Alternatively, the emulsion may be prepared by first emulsifying a cyclic siloxane such as an octaorganocyclo-tetrasiloxane in water in the presence of an anionic emulsifier, adding a well-known ring-opening polymerization catalyst thereto, and effecting polymerization at elevated temperatures, thereby synthesizing an organopolysiloxane having at least two ≡Si—OH bonds in a molecule and at the same time, yielding an end aqueous emulsion. In the latter case, a tri-functional silane represented by $R^1Si(OR^2)_3$ wherein $R^1$ is typically an alkyl, alkenyl or aryl radical and $R^2$ is typically an alkyl or acyl radical may be added to the cyclic organopolysiloxane prior to emulsification, or such a trifunctional silane may be separately emulsified and then added to the cyclic siloxane emulsion.

The amount of the anionic emulsifier used in the preparation of component (A) is preferably about 0.3 to 20 parts by weight, more preferably 0.5 to 5 parts by weight per 100 parts by weight of the organopolysiloxane. Less than 0.3 parts by weight of the emulsifier on this basis would help little to emulsify the siloxane, failing to provide an end aqueous emulsion. More than 20 parts by weight of the emulsifier would eventually result in an elastomer having poor rubbery properties including strength, elongation and hardness.

The amount of water used is not critical as long as an aqueous emulsion is obtained. Generally, about 25 to 600 parts by weight of water is used per 100 parts by weight of the organopolysiloxane.

In preparing the aqueous emulsion, nonionic emulsifiers such as polyoxyethylene alkyl ethers and polyoxyethylene alkyl phenyl ethers or fluoride emulsifiers may be used together as long as they do not detract from rubbery properties.

Component (B) is a critical component which is effective, when a coating composition is applied and cured to an air bag fabric, for improving the adhesion of the cured coating to the fabric. Component (B) is one or more members selected from the group consisting of (B-1) a reaction product of an amino-functional silane or a hydrolyzate thereof with an acid anhydride, (B-2) an epoxy-functional silane or a hydrolyzate thereof, and (B-3) an organosilane having an isocyanate radical and a hydrolyzable radical in a molecule or a hydrolyzate thereof.

(B-1) is a reaction product of an amino-functional silane or a hydrolyzate thereof with an acid anhydride.

The amino-functional silane which can be used in the synthesis of the reaction product is preferably of the following formula:

$$R_n^3Si(OR^2)_{4-n} \quad (1)$$

wherein $R^2$ is an alkyl or acyl radical having 1 to 10 carbon atoms, $R^3$ is a 2-aminoethyl, 3-aminopropyl or N-(2-aminoethyl)-3-amino-propyl radical, and n is an integer of 1 to 3. Illustrative examples of the amino-functional silane include 3-aminopropyltriethoxysilane, N-(2-aminoethyl)-3-aminopropylmethyldimethoxysilane, 3-aminopropylmethyldiethoxysilane, N-(2-aminoethyl)-3-amino-propyltrimethoxysilane, N-triethylene-diaminepropyltrimethoxysilane, N-triethylene-diamine-propylmethyldimethoxysilane, etc. Also useful are (partial) hydrolyzates of these amino-functional silanes.

Examples of the acid anhydride include methyltetrahydrophthalic anhydride, methylhymic anhydride, benzophenonetetracarboxylic anhydride, phthalic anhydride, ethylene glycol bistrimellitate, maleic anhydride, pyromellitic anhydride, succinic anhydride, polyazelaic polyanhydride, trimellitic anhydride, nadic anhydride, phenylmaleic anhydride, methylhexahydrophthalic anhydride, hexahydrophthalic anhydride, dodecylsuccinic anhydride, dichloromaleic anhydride, and chlorendic anhydride, etc.

Reaction between the amino-functional silane and the acid anhydride may be carried out simply by mixing them at room temperature whereupon exothermic reaction readily takes place between them to provide an end product. It is to be noted that since the reaction product tends to gel, the reaction is desirably carried out in the presence of an organic solvent or solvents such as methanol, ethanol, butanol, isopropanol, acetone, methyl ethyl ketone, tetrahydrofuran, and dimethylformamide. Upon reaction, the amino-functional silane or its hydrolyzate and the acid anhydride may be used in equimolar amounts although either of them may be used in excess, if desired.

(B-2) is an epoxy-functional silane or a (partial) hydrolyzate thereof. The preferred epoxy-functional silane is of the following formula:

$$R_n^4Si(OR^2)_{4-n} \quad (2)$$

wherein $R^2$ and n are as defined above, and $R^4$ is a monovalent epoxy-containing organic radical such as

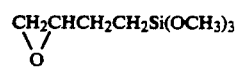

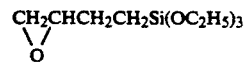

Illustrative examples of the epoxy-functional silane are given below.

$$CH_2\underset{O}{\overset{}{\diagdown\diagup}}CHCH_2CH_2Si(OCH_3)_3$$

$$CH_2\underset{O}{\overset{}{\diagdown\diagup}}CHCH_2CH_2Si(OC_2H_5)_3$$

(B-3) is an organosilane having an isocyanate radical and a hydrolyzable radical in a molecule or a (partial) hydrolyzate thereof. The preferred organosilane is of the following formula:

$$R_m^5-\underset{\underset{(OR^2)_{3-m}}{|}}{Si}-R^6-NCO \quad (3)$$

wherein $R^2$ is as defined above, $R^5$ is a monovalent organic radical having 1 to 10 carbon atoms, for example, alkyl, alkenyl, aryl, aralkyl, and alkoxy-substituted alkyl radicals, $R^6$ is a divalent hydrocarbon radical having 1 to 10 carbon atoms, for example, alkylene radicals such as methylene, ethylene and propylene, and arylene radicals such as phenylene, or a sulfur-substituted divalent hydrocarbon radical, and m is a number of from 0 to 3.

Illustrative examples of the organosilane are given below.

$$(CH_3O)_3-Si-(CH_2)_3-NCO$$

$$(C_2H_5O)_3-Si-(CH_2)_3-NCO$$

$$\left(\underset{\underset{CH_3}{|}}{CH=C-O}\right)_3-Si-(CH_2)_3-NCO$$

$$(CH_3OC_2H_4O)_3-Si-(CH_2)_3-NCO$$

$$(CH_3O)_2-\underset{\underset{CH_3}{|}}{Si}-(CH_2)_3-NCO$$

$$(C_2H_5O)_2-\underset{\underset{CH_3}{|}}{Si}-(CH_2)_3-NCO$$

$$(CH_3O)_3-Si-(CH_2)_2S(CH_2)_3-NCO$$

$$(CH_3O)_2-\underset{\underset{CH_3}{|}}{Si}-(CH_2)_2S(CH_2)_2-NCO$$

The organosilane hydrolyzates include a hydrolyzate of an organosilane alone and a hydrolyzed product of a mixture of an organo-silane and another silane such as $(R^2O)_2SiR_2^1$ and $(R^2O)_3SiR^1$ wherein $R^1$ and $R^2$ are as defined above.

Component (C) is colloidal silica. The colloidal silica need not be limited to a particular type. For example, colloidal silica species having a particles size of 10 to 40 m $\mu$ and stabilized with sodium or aluminum ions are useful. They are commercially available, for example, as SNOWTEX 40 from Nissan Chemical K.K.

It is recommended to mix the colloidal silica with component (B) to form a uniform dispersion which is blended with the remaining components to form a composition. In mixing colloidal silica with component (B), more particularly (B-1), (B-2) or (B-3), 1 to 50 parts by weight of colloidal silica is preferably mixed with 0.01 to 10 parts by weight of component (B). More preferably, 0.1 to 20 parts by weight, especially 1 to 5 parts by weight of component (B) is used per 100 parts by weight of colloidal silica. Smaller amounts of component (B) would improve adhesion to a less extent whereas larger amounts of component (B) would reduce the flow of the coating composition.

This mixture or dispersion is prepared by gradually adding dropwise component (B) to a desired amount of colloidal silica while agitating at room temperature. Insoluble matter forms at the initial stage of dropwise addition, but continuing agitation turns the mixture into a wholly uniform, semi-transparent, flowing liquid dispersion.

The dispersion is blended with component (A), preferably in an amount of about 1 to 60 parts by weight, more preferably about 3 to 30 parts by weight per 100 parts by weight of the siloxane in component (A). Less than 1 part of the dispersion on this basis would sometimes result in coatings with poor rubbery properties whereas more than 60 parts by weight of the dispersion would result in coatings which are low in elongation and thus susceptible to cracking.

It is to be noted that component (B) is effective not only in improving the adhesion of coatings to air bag fabrics, but also in enhancing the reinforcement of component (A) or organopolysiloxane by colloidal silica.

Component (D) is a curing catalyst which is used for curing the air bag coating composition. Examples of the curing catalyst include organic acid metal salts such as dibutyltin dilaurate, dioctyltin dilaurate, dibutyltin diacetate, tin octylate, tin laurate, iron octylate, lead octylate, tetrabutyl-titanate, amine compounds such as n-hexylamine and guanidine or hydrochloride salts thereof.

On use, the curing catalyst is desirably formed into an O/W emulsion in a conventional manner using water and an emulsifier.

Preferably, the curing catalyst is used in amounts of about 0.01 to 10 parts by weight, more preferably about 0.1 to 3 parts by weight per 100 parts by weight of the siloxane in component (A). Less than 0.01 part of the curing catalyst would fail to cure the coating composition to a satisfactory extent whereas more than 10 parts of the curing catalyst would provide no further effect to the curing reaction and rather allow the resulting elastomer to crack.

In preparing the air bag coating composition of the present invention from the above-mentioned components, it is essential to previously blend components (B) and (C) uniformly. The best blending order is to first prepare an aqueous silicone emulsion as component (A), mixing component (A) with a uniform pre-blend of components (B) and (C), and finally mixing component (D). This mixing is satisfactorily achieved by a conventional agitating machine. If component (B) (B-1, B-2 or B-3) is added to a mixture of components (A), (C) and (D), then a gel-like mass forms which cannot be uniformly dissolved by any agitation means.

The air bag coating composition is preferably adjusted to pH 3 to 12, more preferably pH 5 to 9. Outside this pH range, the coating composition gives rise to some handling problems. The pH range of 6 to 9 is most appropriate for the safety of the operator. For pH adjustment, a variety of pH adjusting agents may be used in accordance with a desired pH value. Sodium carbonate is the preferred pH adjusting agent.

If desired, the air bag coating composition of the invention may contain any of additives which are usually added to or blended in aqueous paints, for example, thickeners, debubbling agents, pigments, dyes, preservatives, and introfiers (e.g., aqueous ammonia).

The base fabrics of air bags to which coatings of the present composition are cured include fibers of nylon, TETRON, VINYLON, polyester and polyurethane and woven fabrics thereof, with nylon and polyester being preferred. A plain weave is the useful weave.

The coating composition is applied to base fabrics by any desired coating technique, for example, calendering, knife coating, brush coating, dipping, and spraying.

Thereafter, the coatings are cured, preferably by heat vulcanization at 110° to 150° C. for several seconds to about 20 minutes. Then cured products having a varying crosslinking density covering silicone rubber, silicone resin and silicone gel are obtained depending on the particular components used. Room temperature curing is also possible. That is, simply by removing water therefrom, the composition can be cured at room temperature into an elastomer having acceptable rubbery properties. In either case, there is obtained a cured coating which firmly bonds to the base fabric and has a tack-free surface.

There has been described an air bag coating composition which is applied and cured to plain weave air bag fabrics, typically plain weave base fabrics comprised of polyimide and polyester fibers. Since no organic solvent is used, the composition is safe to the health of the operator during handling and coating operation. The composition cures into a coating which is characterized by an enhanced bond to the base fabric and a tack-free surface and has excellent rubbery properties. Consequently, the coating is resistant to cracking upon instantaneous inflation of the air bag.

EXAMPLE

Examples of the present invention are given below by way of illustration and not by way of limitation. Unless otherwise stated all parts and percents are by weight.

EXAMPLE 1

Air bag coating compositions were obtained by separately preparing Components (I), (II)-1 and (III) in accordance with the following procedures, and blending them in the proportion shown in Table 1 to form aqueous silicone emulsion compositions.

Component (I)

An aqueous silicone emulsion was prepared by emulsifying 500 parts of octamethyltetrasiloxane, 25 parts of methyltrimethoxysilane, 46.5 parts of water and 10 parts of dodecylbenzenesulfonic acid in a homomixer, passing twice the mixture through a homogenizer under a pressure of 3,000 psi to form a stable emulsion, charging a flask with the emulsion, and heating the flask to 70° C. for 12 hours. The emulsion was cooled down to room temperature, allowed to stand for 24 hours, and then adjusted to pH 8.0 with sodium carbonate. The emulsion contained 47% of non-volatile matter. The organopolysiloxane which was separated from the emulsion using methanol has a viscosity of 7,200 centipoise as measured in 20% toluene solution at 25° C.

Component (II)-1

A uniform dispersion was prepared by adding dropwise 221 parts of 3-aminopropyltriethoxysilane to a mixture of 98 parts of maleic anhydride and 319 parts of ethanol while agitating the mixture. This reaction product, 30 parts, was gradually added dropwise to 1,000 parts of colloidal silica (SNOWTEX 40 commercially available from Nissan Chemical K.K., active ingredient 40%, $Na_2O$ 0.6%, pH 9.3) at room temperature while agitating. There was obtained a semi-transparent uniform dispersion at pH 3.4.

Component (III)

A curing agent emulsion was prepared by emulsifying 30 parts of dibutyltin dilaurate, 1 part of polyoxyethylene nonyl phenyl ether and 69 parts of water in a conventional manner.

Example 2

An air bag coating composition was prepared as in Example 1 except that the following component (II)-2 was used instead of component (II)-1.

Component (II)-2

A semi-transparent uniform dispersion was prepared by gradually adding dropwise 30 parts of 3-epoxypropyltriethoxysilane to 100 parts of colloidal silica (SNOWTEX 40) at room temperature while agitating.

Example 3

An air bag coating composition was prepared as in Example 1 except that the following component (II)-3 was used instead of component (II)-1.

Component (II)-3

A semi-transparent uniform dispersion was prepared by gradually adding dropwise 30 parts of an isocyanate radical-containing silane represented by $(C_2H_5O)_3$-$Si(CH_2)_3NCO$ to 100 parts of colloidal silica (SNOWTEX 40) at room temperature while agitating.

COMPARATIVE EXAMPLE

An air bag coating composition was prepared as in Example 1 except that component (II)-4 consisting solely of colloidal silica was used instead of component (II)-1.

Each of the coating compositions was applied to one surface of plain weave fabric of 420-denier nylon filaments (46 filaments/inch in warp and weft) to a dry coating thickness of about 100 μm. The coating was cured by allowing it to stand at a temperature of 20° C. and a relative humidity of 60% for 48 hours. There was obtained a coated fabric.

Next, one part type silicone RTV rubber (KE-451T commercially available from Shin-Etsu Chemical Co., Ltd.) was applied to the cured coating on the fabric to a thickness of about 1 mm. Another similarly coated fabric was laid on the coated fabric such that the RTV rubber was sandwiched between the cured coatings. The RTV rubber was cured under conditions: 20°±3° C., RH 45-65%, and 4 days. The assembly was cut to a strip of 2.5 cm wide and one fabric was pulled in a 180° direction by means of an autograph for measuring the bonding force, with which the adhesion of the coating to the fabric was evaluated.

TABLE 1

| Component, parts | Example 1 | Example 2 | Example 3 | Comparative Example |
|---|---|---|---|---|
| (I) | 100 | 100 | 100 | 100 |
| (II)-1 | 7.5 | — | — | — |
| (II)-2 | — | 7.5 | — | — |
| (II)-3 | — | — | 7.5 | — |
| (II)-4 | — | — | — | 7.5 |
| (III) | 4.3 | 4.3 | 4.3 | 4.3 |
| pH | 8.0 | 8.0 | 8.0 | 8.0 |
| Bonding force (kg/2.5 cm) | 10.5 | 11.0 | 12.0 | 0.2 |
|  | AR | AR | AR | IS |

AR: adhesive (RTV rubber) rupture  IS: separation at the interface between coating and nylon fabric

We claim:

1. An aqueous silicone emulsion composition for forming a coating on an air bag, comprising:
   (A) an organopolysiloxane having at least two hydroxyl radicals attached to silicon atoms in a molecule, emulsified in water,
   (B) at least one member selected from the group consisting of an epoxy-functional silane represented by the following formula:

   $R_n^4Si(OR^2)_{4-n}$ wherein $R^2$ is an alkyl or acyl radical having 1 to 10 carbon atoms, $R^4$ is a monovalent epoxy-containing radical, and n is an integer of 1 to 3, or a hydrolyzate thereof, and an organosilane represented by the following formula:

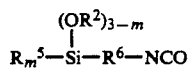
   $$R_m^5-\underset{\underset{\displaystyle (OR^2)_{3-m}}{|}}{Si}-R^6-NCO$$

wherein $R^2$ is as defined above, $R^5$ is a monovalent organic radical having 1 to 10 carbon atoms, $R^6$ is a divalent hydrocarbon radical having 1 to 10 carbon atoms, optionally interrupted in the chain by a sulfur atom, and m is a number of from 0 to 3, or hydrolyzate thereof,
   (C) colloidal silica, and
   (D) a curing catalyst.

2. An air bag comprising a base fabric having applied thereon a cured coating of the composition of claim 1.

3. The composition of claim 1 wherein the organopolysiloxane (A) has a molecular weight of 10,000 to 500,000 and a degree of polymerization of from 3000 to 7000.

4. The composition of claim 1 wherein (B) is an epoxy-functional silane wherein $R^4$ is a radical of one of the following formulae:

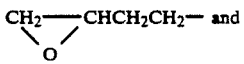
$$CH_2\underset{\diagdown O \diagup}{-}CHCH_2CH_2- \text{ and}$$

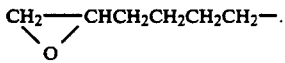
$$CH_2\underset{\diagdown O \diagup}{-}CHCH_2CH_2CH_2CH_2-.$$

5. The composition of claim 4 wherein the epoxysilane is a compound of one of the following formulae:

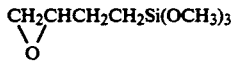
$$CH_2\underset{\diagdown O \diagup}{CHCH_2CH_2Si(OCH_3)_3}$$

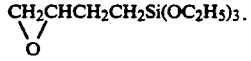
$$CH_2\underset{\diagdown O \diagup}{CHCH_2CH_2Si(OC_2H_5)_3}.$$

6. The composition of claim 1 wherein (B) is an organosilane and $R^5$ is an alkyl, alkenyl, aryl, aralkyl or alkoxyalkyl radical of 1 to 10 carbon atoms.

7. The composition of claim 6 wherein the organosilane is a compound of one of the following formulae:

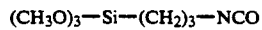
$(CH_3O)_3-Si-(CH_2)_3-NCO$

-continued

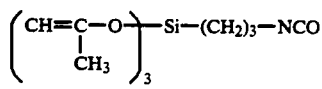

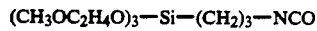

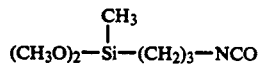

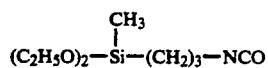

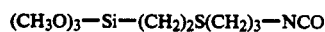

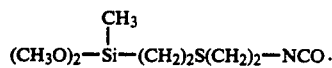

8. The composition of claim 1 wherein the colloidal silica (C) has a particle size of from 10 to 40 μm.

9. The air bag of claim 2 wherein the organopolysiloxane (A) has a molecular weight of 10,000 to 500,000 and a degree of polymerization of from 3000 to 7000.

10. The air bag of claim 2 wherein (B) is an epoxy-functional silane wherein $R^4$ is a radical of one of the following formulae:

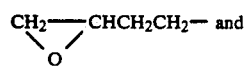

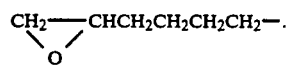

11. The air bag of claim 2 wherein the epoxy-silane is a compound of one of the following formulae:

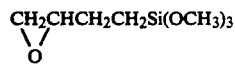

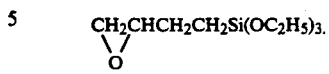

12. The air bag of claim 2 wherein (B) is an organosilane and $R^5$ is an alkyl, alkenyl, aryl, aralkyl or alkoxyalkyl radical of 1 to 10 carbon atoms.

13. The air bag of claim 2 wherein the organosilane is a compound of one of the following formulae:

(CH₃O)₃—Si—(CH₂)₃—NCO (C₂H₅O)₃—Si—(CH₂)₃—NCO

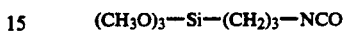

(CH₃OC₂H₄O)₃—Si—(CH₂)₃—NCO

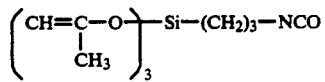

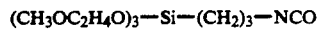

(CH₃O)₃—Si—(CH₂)₂S(CH₂)₃—NCO

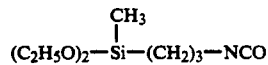

14. The air bag of claim 2 wherein the colloidal silica (C) has a particle size of from 10 to 40 μm.

15. The air bag of claim 2 wherein the base fabric is nylon or polyester.

* * * * *